United States Patent [19]
Teske et al.

[11] 3,711,912
[45] Jan. 23, 1973

[54] SUPPORT ROLLER FOR CONVEYOR BELTS AND THE LIKE

[76] Inventors: Fritz Teske, Industriestr. 28; Lothar Teske, Industriestr. 30, both of Porz-Westhoven, Germany

[22] Filed: Feb. 5, 1971

[21] Appl. No.: 112,875

[30] Foreign Application Priority Data

Feb. 5, 1970 Germany..................P 20 05 211.3

[52] U.S. Cl. .............................................. 29/116 R
[51] Int. Cl. ............................................... B21b 13/02
[58] Field of Search ................. 29/116 R, 130, 132

[56] References Cited

UNITED STATES PATENTS

| 2,685,548 | 8/1954 | Drozdowski | 29/130 X |
|---|---|---|---|
| 2,230,289 | 2/1941 | Dodge | 29/130 |
| 2,741,014 | 4/1956 | Hubbard | 29/130 |
| 3,475,803 | 11/1969 | Hill | 29/132 |
| 3,571,878 | 3/1971 | Alderfer | 29/132 |
| 2,270,436 | 1/1942 | Hart | 29/116 R |
| 3,435,500 | 4/1969 | Aser et al. | 29/130 |
| 2,997,406 | 8/1961 | Freeman et al. | 29/130 X |
| 3,490,119 | 1/1970 | Fukuyama et al. | 29/130 UX |

FOREIGN PATENTS OR APPLICATIONS 288,851   1/1967   Australia..............................29/132

Primary Examiner—Alfred R. Guest
Attorney—Markva & Smith

[57] ABSTRACT

A cylindrical supporting roller comprises a central core of a light-weight material having a low density and a casing extending over the surface of the core which comprises a material having a substantially greater density to reinforce the core. Both the core and the casing may comprise a closed pore foam material such as polyurethane, the density of polyurethane in the casing being greater than that of the core.

8 Claims, 5 Drawing Figures

PATENTED JAN 23 1973 3,711,912

INVENTORS
FRITZ TESKE & LOTHAR TESKE
BY
Markens, Smith & Kruger
ATTORNEYS

PATENTED JAN 23 1973 3,711,912

INVENTORS
FRITZ TESKE & LOTHAR TESKE
BY
Markva, Smith & Kruger
ATTORNEYS 3,711,912

SUPPORT ROLLER FOR CONVEYOR BELTS AND THE LIKE

This invention relates to a supporting roller for conveyor means such as conveyor belts and the like. The roller is rotatably mounted to support and guide a continuous belt used for conveying articles.

Commonly supporting rollers comprise a hollow cylinder with end walls at opposite ends thereof. Either the roller is mounted on a rotatably mounted spindle, the end walls engaging the spindle, or a stationary spindle passes through the center of the roller, the end walls including annular bearing means for rotatably supporting the roller on the spindle. The roller, being hollow, contains a comparatively large volume of air which frequently contains a substantial quantity of moisture causing corrosion on the internal parts and surfaces of the roller. Frequently, rust forms on bearing parts causing damage and premature wear.

Because the volume of air contained in the hollow roller is relatively large, it is sensitive to changes in temperature which causes the air volume to expand and contract resulting in stress and possible distortion of the roller and damage to the bearing assemblies in the opposite end walls of the roller. For example, when the air contained within the hollow roller expands due to increased heat, the air forces the lubricating grease of the bearing assembly outwardly. Conversely, as the air cools, it contracts causing dirt to be drawn into the bearing resulting in increased wear and a shortened life. The suction caused by the contracting air not only draws in dirt but also other corrosive constituents of the atmosphere resulting in deterioration of the bearing assemblies and other internal parts of the roller.

An object of the invention is an improved supporting roller construction in which the damaging effects caused by entrapped air and circulating air are avoided.

A further object of the invention is to avoid the distorting effects caused by the expansion and contraction of air contained within the supporting roller.

A still further object of the invention is a supporting roller construction wherein damage to the bearings and internal parts of the roller caused by air flow between the atmosphere and the interior of the roller is avoided.

Briefly the construction of the improved supporting roller of the present invention comprises the supporting roller being made primarily from a light-weight material such as synthetic plastic foam material. The supporting roller is substantially solid throughout, the greater part of the roller comprising a central core of light-weight material having a very low density with a casing extending over the surface of the core, the casing comprising a material having a density which is substantially greater than that of the core. Preferably, the casing is made of the same light-weight material as the core though with a higher density. A casing is necessary in order that the supporting roller will withstand the stresses to which it is subjected during use. The roller should not be made completely of a high density material since this results in increased weight and possible distortion due to changes in atmospheric conditions.

Various embodiments of the invention will be more specifically described with reference to the accompanying drawings wherein.

Figure 1:
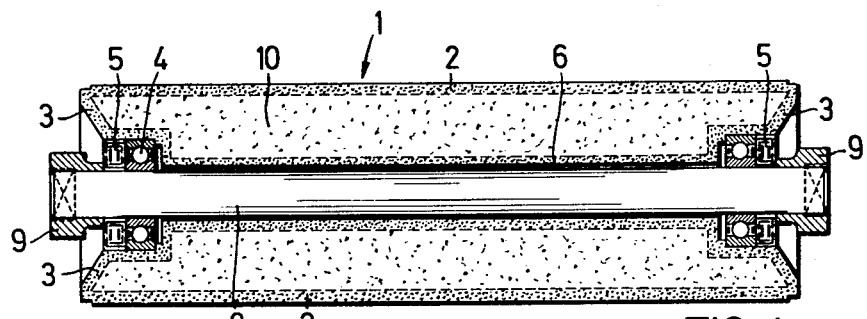
FIG. 1 is a cross-sectional view of one embodiment of a cylindrical supporting roller in accordance with the invention.

With reference to FIG. 1, the supporting roller shown generally at 1 comprises an annularly shaped central core 10 which is completely enclosed both internally and externally in a casing. Both the central core and the casing consist of a light-weight material which may be the same material such as a synthetic plastic foam which preferably contains closed pores so that any movement of air inside the supporting roller is prevented. An example of a preferred synthetic plastic foam material is polyurethane. The density of the annular central core 10 is substantially less than that of the casing. Thus, the pores of the casing material are substantially smaller than the pores of the central core material to give the casing the necessary added strength. Alternatively, both the central core and casing may comprise a cross-linked polyurethane wherein the polyurethane of the casing is cross-linked to a greater degree than the cross-linked polyurethane of the central core.

The casing comprises a tubular surface 2, end walls 3 and an interior cylindrical surface 6. Bearing assemblies comprising roller bearings 4 and packing elements 5 are press fitted into recesses surrounded by the casing material at opposite ends of the roller whereby the roller may be rotatably mounted on a spindle 8 having pressed-on holding caps 9 at opposite ends thereof. An anti-friction compound such as a silicone grease may be applied to the internal surface of the roller to prevent frictional contact between the interior cylindrical surface and the exterior surface of the spindle 8.

It will be readily appreciated that what air is contained within the supporting roller is entrapped in a plurality of closed pores providing no opportunity for air flow through the bearing assemblies with changes in temperature. Any expansion and contraction of the air contained in the pores will be relatively small and will be absorbed by the flexible plastic material without affecting or distorting the external dimensions of the supporting roller.

Figure 2:
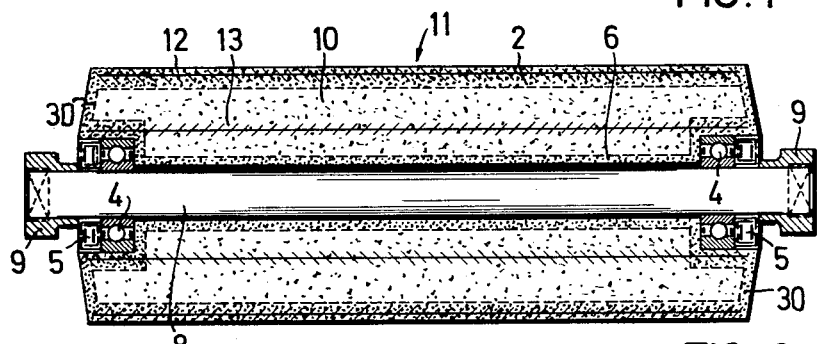
FIG. 2 is a cross-sectional view of a modification of the cylindrical supporting roller of FIG. 1.

FIG. 2 shows a modified form of the supporting roller of FIG. 1. The roller shown generally at 11 includes a number of elements substantially identical to those of FIG. 1 which are given identical numerical designations. Reinforcement means which comprises a fabric material made of wire or synthetic fiber filaments such as nylon is located at 12 in the tubular part 2 of the casing and in the core at 13 where it extends into the casing material at both ends of the roller adjacent the bearings 4 and packing elements 5. The reinforcing fabric 12 increases the strength of the external surface of the roller and avoids abrasion. The reinforcing fabric 13 assists in maintaining the proper shape of the roller irrespective of the pressure applied to its surface. The end walls 30 extend outwardly from the cylindrical surface of the roller such that with the application of pressure to the surface, the walls are pressed outwardly but are retained in position by the reinforcing fabric 13 extending between the opposite ends of the roller.

Figure 3:
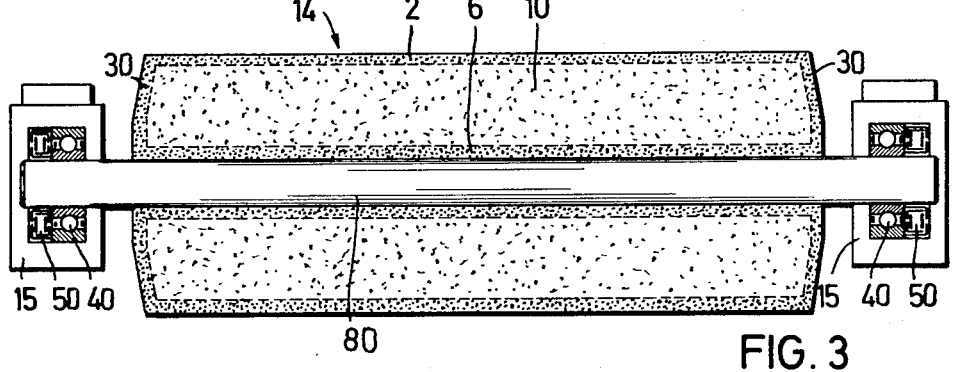
FIG. 3 is a cross-sectional view of another embodiment of a cylindrical supporting roller in accordance with the invention.
Figure 4:
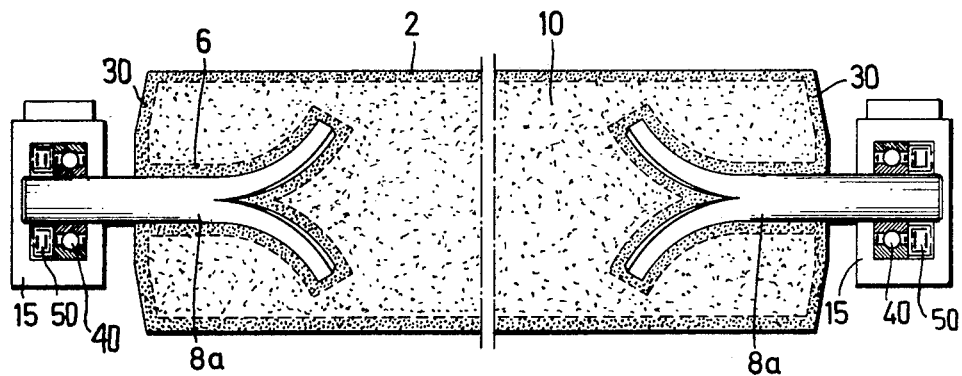
FIG. 4 is a cross-sectional view of another embodiment of a cylindrical supporting roller in accordance with the invention.

In FIG. 3 the spindle 80 is made an integral part of the roller 14, the interior cylindrical surface 6 being bonded or press fitted to the spindle 80. The ends of the spindle 80 are rotatably mounted in cap bearings 15 containing roller bearings 40 and packing elements 50.

Where the supporting roller is of substantial length the solid spindle 80 is eliminated as shown in FIG. 4. Instead journals 8a are mounted internally of the roller at opposite ends and extend outwardly in the same manner as the spindle 80 in FIG. 3. The journals 8a must be properly anchored in the light-weight central core material 10. The internal end of the journal is split so that it cannot be withdrawn from the roller and is surrounded by the stronger casing material 6 as reinforcement.

Figure 5:
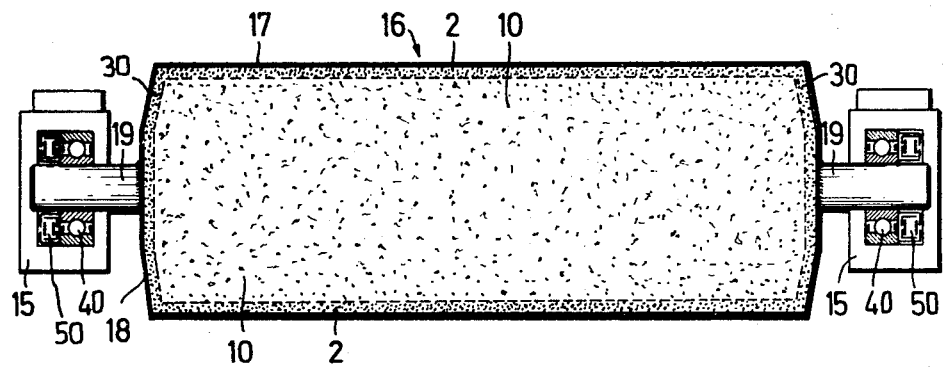
FIG. 5 is a still further embodiment of a cylindrical supporting roller in accordance with the present invention.

A still further embodiment of the present invention is shown in FIG. 5 wherein the supporting roller 16 includes a central core 10 of the light-weight material having a low density, a casing of the greater density material which comprises the tubular part 2 and end walls 3, and a light-weight external housing comprising cylindrical section 17 with end walls 18. This external housing serves as a closed thin-walled shell and preferably consists of sheet metal such as steel. The journals 19 are welded to the sheet metal end walls 18 and are supported in the bearing caps 15. With this construction the possibility of the supporting roller being distorted which could cause poor concentric rotation and possible misalignment of the bearings is avoided. Irrespective of whether superatmospheric or subatmospheric pressure is developed internally with temperature fluctuations, the internal light-weight construction, comprising the central core and casing, prevents any such distortion from taking place.

It will be appreciated that with the present invention damage and distortion of cylindrical supporting rollers for conveyor belts caused by temperature fluctuations resulting in changes in air pressure within the roller are avoided. Such changes in pressure cannot cause air flow through the bearing construction and the porous internal material maintains the external dimensions of the roller stable irrespective of the atmospheric temperature.

While the invention has been described in connection with specific embodiments thereof, various modifications thereof will occur to those skilled in the art without departing from the spirit and scope of the invention as set forth in the appended claims.

We claim:

1. A cylindrical supporting roller construction for conveyor belts and the like comprising:
   a. an annular longitudinally extending roller body having a centrally located longitudinally extending bore, said roller body having a cylindrical peripheral surface, annular end surfaces and a surface surrounding said bore;
   b. a spindle positioned within said bore, the external surface of said spindle being spaced from the surface of said roller body surrounding said bore; and
   c. bearing means positioned within said bore internally of said roller body between the opposite ends thereof for rotatably mounting said roller body on said spindle;
   d. said roller body consisting of a synthetic plastic foam material having closed pores, the portion of said foam material adjacent to said peripheral and end surfaces and said surface surrounding said bore being of greater density than the internal portion contained within said portion adjacent said surfaces;
   e. whereby said roller body is reenforced and capable of supporting a conveyor belt while freely rotatably about said spindle.

2. A roller construction as defined in claim 1 wherein the synthetic plastic foam material comprises polyurethane.

3. A roller construction as defined in claim 2 wherein said synthetic plastic foam material comprises cross-linked polyurethane, the cross-linked polyurethane of said greater density portion of said roller body adjacent the surfaces thereof having a greater degree of cross-linking than that internal portion contained within said portion adjacent said surfaces.

4. A roller construction as defined in claim 1 wherein said bearing means comprises a plurality of journals mounted in the portion of said foam material surrounding said bore and having the greater density, said journals being mounted adjacent the opposite ends of said roller body.

5. A cylindrical supporting roller construction for conveyor belts and the like comprising:
   a. an annular longitudinally extending roller body having a centrally located longitudinally extending bore, said roller body having a cylindrical peripheral surface, annular end surfaces and a surface surrounding said bore,
   b. a spindle positioned within said bore, the external surface of said spindle being spaced from the surface of said roller body surrounding said bore, and
   c. bearing means positioned within said bore internally of said roller body between the opposite ends thereof for rotatably mounting said roller body on said spindle,
   d. said roller body consisting of a synthetic plastic foam material having closed pores, the portion of said foam material adjacent to said peripheral and end surfaces and said surface surrounding said bore being of greater density than the internal portion contained within said portion adjacent said surfaces, and a cylindrically shaped wire or synthetic fiber filament reenforcement embedded in said internal portion of said foam material and extending between opposite ends of said roller body,
   e. whereby said roller body is reenforced and capable of supporting a conveyor belt while freely rotatable about said spindle.

6. A roller construction as defined in claim 5 wherein the synthetic plastic foam material comprises polyurethane.

7. A roller construction as defined in claim 6 wherein said synthetic plastic foam material comprises cross-linked polyurethane, the cross-linked polyurethane of said greater density portion of said roller body adjacent the surfaces thereof having a greater degree of cross-linking than that internal portion contained within said portion adjacent said surfaces.

8. A roller construction as defined in claim 5 wherein said bearing means comprises a plurality of journals mounted in the portion of said foam material surrounding said bore and having the greater density, said journals being mounted adjacent the opposite ends of said roller body.

* * * * *